United States Patent
Carson

(10) Patent No.: US 6,483,458 B1
(45) Date of Patent: Nov. 19, 2002

(54) METHOD FOR ACCURATELY TRACKING AND COMMUNICATING WITH A SATELLITE FROM A MOBILE PLATFORM

(75) Inventor: Ronald Steven Carson, Renton, WA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 09/870,365

(22) Filed: May 30, 2001

(51) Int. Cl.[7] .................................................. H04B 7/00
(52) U.S. Cl. ........................... 342/367; 342/74; 342/81; 342/368; 342/377
(58) Field of Search ................................ 701/200, 203, 701/213–216; 342/62, 63, 64, 65, 70, 74–81, 357.01–357.17, 417, 422, 426, 427, 155–158, 25, 359, 368–377, 367; 725/75, 76; 343/757

(56) References Cited

U.S. PATENT DOCUMENTS

| | | | |
|---|---|---|---|
| 3,699,324 A | * 10/1972 | Iliff et al. ..................... 701/200 |
| 4,055,845 A | 10/1977 | Ladrick | |
| 4,263,539 A | 4/1981 | Barton | |
| 4,542,326 A | 9/1985 | Hornback | |
| 4,617,567 A | * 10/1986 | Chan ............................. 342/25 |
| 4,853,699 A | * 8/1989 | Easton .......................... 342/25 |
| 5,202,695 A | * 4/1993 | Hollandsworth et al. ... 342/359 |
| 5,398,035 A | 3/1995 | Densmore et al. | |
| 5,440,314 A | * 8/1995 | Tabourier ..................... 342/371 |
| 5,485,156 A | * 1/1996 | Manseur et al. .............. 342/77 |
| 5,678,171 A | * 10/1997 | Toyama et al. ............... 725/76 |
| 5,790,175 A | * 8/1998 | Sklar et al. .................... 725/76 |
| 5,854,609 A | * 12/1998 | Pyo et al. ..................... 342/359 |
| 5,917,446 A | * 6/1999 | Greenspan ................... 342/373 |
| 6,208,307 B1 | * 3/2001 | Frisco et al. ................. 343/757 |
| 6,400,317 B2 | * 6/2002 | Rouphael et al. ........... 342/367 |

* cited by examiner

Primary Examiner—Bernarr E. Gregory
(74) Attorney, Agent, or Firm—Harness Dickey & Pierce P.L.C.

(57) ABSTRACT

A method for accurately tracking and communicating with a satellite from a mobile platform, wherein the satellite has an antenna which performs both transmit and receive functions from a single antenna aperture. The method involves using an inertial reference unit (IRU) of the mobile platform to initially acquire the signal from the satellite. A sequential lobing process is then used to more accurately center the antenna aperture relative to the receive beam from the satellite. The antenna is then used to transmit data or other information, and the antenna pointing is maintained by an additional IRU local to the antenna with higher accuracy and lower latency than the IRU of the mobile platform. Periodically, transmissions from the antenna are inhibited and the sequential lobing process is repeated to eliminate for any inertial reference drift error. The method allows for more accurate antenna pointing when a single antenna aperture is used for both transmit and receive functions without significantly interfering with the transmission of data or information from the antenna.

12 Claims, 4 Drawing Sheets

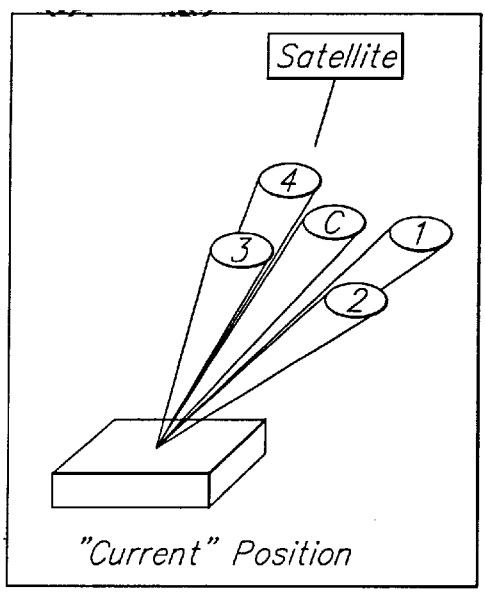
"Current" Position
Prior Art
Fig. 1a.
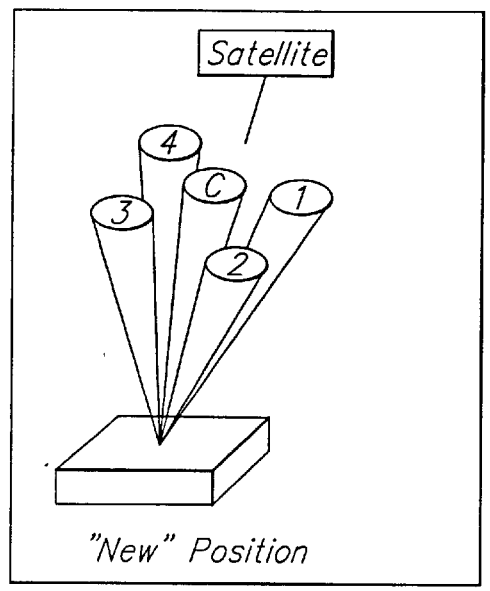
"New" Position
Prior Art
Fig. 1b.
Prior Art
Fig. 3.
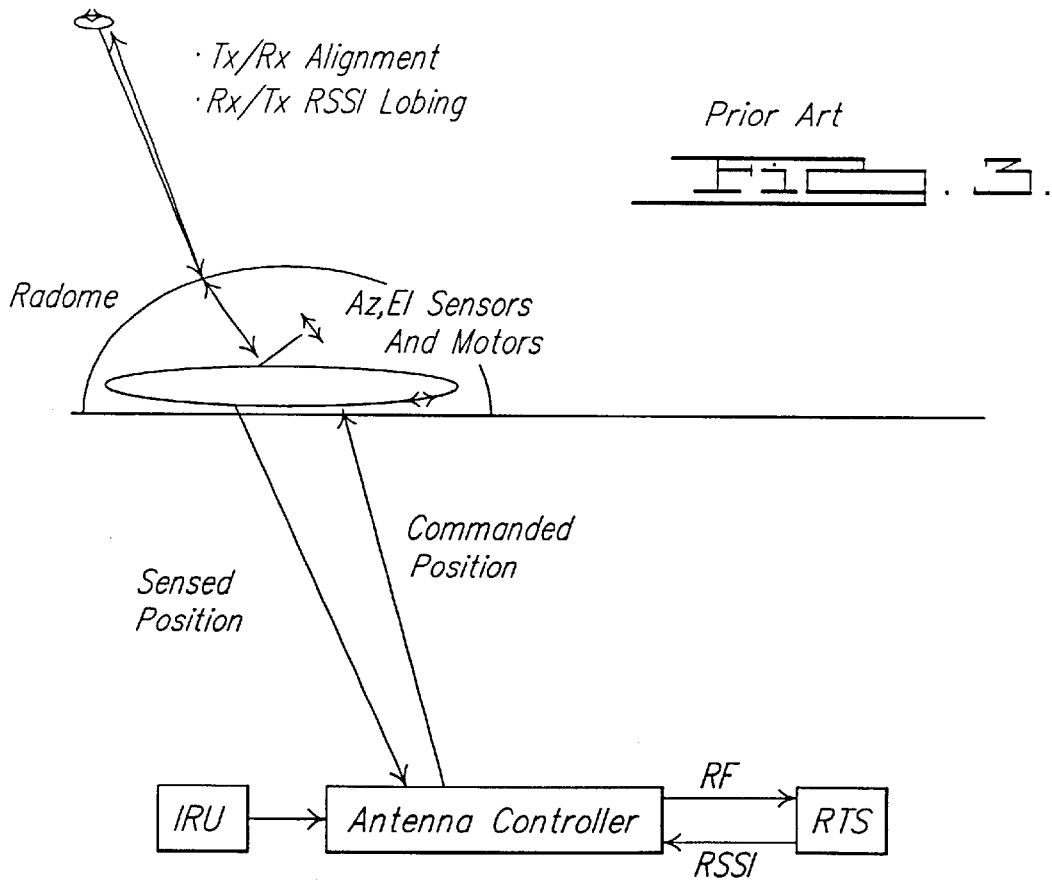

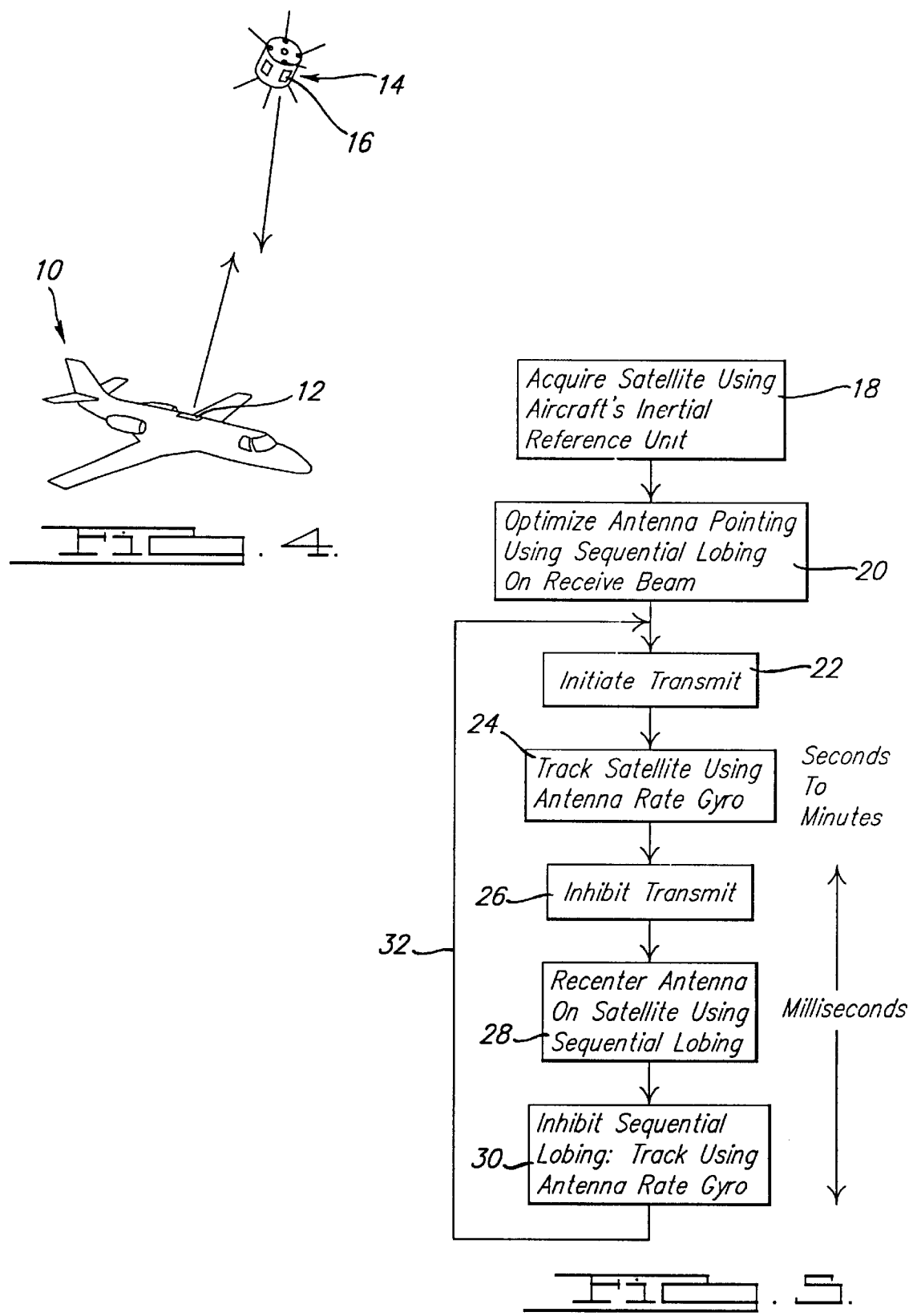

——— Time Behavior Of Combined Sequential Lobing Plus Rate Gyro
— — — RMS Error Of IRU-Only Tracking
— — Step Size For Sequential Lobing
— — — RMS Error Of Supplemental Rate Gyro

METHOD FOR ACCURATELY TRACKING AND COMMUNICATING WITH A SATELLITE FROM A MOBILE PLATFORM

FIELD OF THE INVENTION

The present invention relates to satellite communication systems, and more particularly to a system for use with a mobile platform having an antenna aperture performing receive and transmit functions, and to a method for causing the antenna aperture to accurately track a target satellite while the mobile platform is moving.

BACKGROUND OF THE INVENTION

High precision tracking of communication satellites from mobile platforms such as aircraft, ships and land vehicles is required for both optimizing data rate (i.e., peak energy from/to target) and for preventing interference with satellites orbiting adjacent to a target satellite. Various methods for tracking have been used including "dead-reckoning" or open-loop, where a calculation is made as to the correct pointing angles based on known satellite and platform positions and platform attitude. Other methods, such as "closed loop" tracking methods, make use of some form of feedback control by signal optimization. These methods work adequately for received signals but not adequately for transmitted signals from the mobile platform to satellites over distances which create latency in the feedback control loop with respect to the required bandwidth. Such a situation would be represented by, for example, geostationary satellites communicating with mobile platforms having high attitude accelerations, such as aircraft and land vehicles.

For centering an antenna aperture with respect to a received antenna beam from a satellite, one well known technique is sequential lobing. Sequential lobing involves steering the antenna aperture deliberately a known distance away from a peak received signal in each of four directions around the peak signal. This is illustrated in FIG. 1. Measurements of the received power or decoded signal are used to calculate where the actual peak of the beam or signal is located, as indicated in FIG. 1b, and the beam is recentered for the next cycle. A receive-only antenna can use this approach quite effectively to maintain pointing accuracy. However, the deficiency with this approach is that a transmitting antenna slaved to such a receive beam will execute the same steptracking, inherently adding inaccuracy as the beam is deliberately stepped away from the known center.

A second technique of antenna pointing relies on increasingly accurate methods of open-loop calculation to maintain accurate pointing. Even if arbitrarily accurate tracking during movement of the mobile platform is possible, the major drawback with this approach is in initially establishing an accurate starting point (i.e., initially determining an accurate estimate of the position of the target satellite relative to the mobile platform).

Prior systems have separated the receive and transmit functions into discrete apertures so that sequential lobing can be performed with the receive beam, and then the transmit beam is computationally slaved to the correct position. This is illustrated in FIG. 2.

For antennas in which transmit and receive functions are performed in the same physical antenna aperture, several error sources are eliminated, but the technique of sequential lobing cannot be used when the transmit beam pointing accuracy requirement is smaller than the step-size of the misalignments used during the sequential lobing process. Such a situation would still result in an error (i.e., misalignment) in the pointing angle of the transmit antenna relative to the target satellite. This is shown in FIG. 3.

Therefore, there is a need for a method of accurately pointing an antenna which performs both receive and transmit functions, and which is located on a moving platform, at a target satellite. More specifically, there is needed a method which allows an antenna aperture performing both transmit and receive functions to initially acquire a signal from a target satellite, and thereafter to accurately determine the beam center of a receive beam transmitted by the satellite, to use an inertial reference unit (IRU) of the mobile platform for tracking the satellite, and to periodically "fine adjust" the pointing of the antenna aperture without significantly impeding the transmission of data from the mobile platform to the satellite.

SUMMARY OF THE INVENTION

The present invention is directed to a method for more accurately tracking and communicating with a satellite from a mobile platform. The method of the present invention is particularly adapted for use with antenna apertures which are required to receive and transmit information to and from a target satellite while the mobile platform which the antenna aperture is mounted on is moving.

The method of the present invention involves initially requiring the satellite to use the mobile platform's inertial reference unit (IRU) and information stored in an antenna controller associated with the antenna aperture as to the approximate location of the target satellite. Once the signal from the satellite is acquired, a conventional sequential lobing process is performed to more accurately center the antenna aperture relative to the receive beam received by the aperture. Once the sequential lobing process is completed, the antenna can then be used to transmit data or other information from the mobile platform to the satellite. While transmitting, a second inertial reference unit in the form of a "rate gyro" local to the antenna is used instead of the IRU of the aircraft to maintain the antenna aperture pointed at the target satellite.

Periodically the antenna controller interrupts the transmission of data or other information from the antenna to the target satellite and again uses the receive capability of the antenna to perform the sequential lobing process. Once this process is completed, transmissions from the antenna are again enabled, thus allowing the antenna to be used to transmit information to the satellite. This process of alternately transmitting from the antenna aperture and inhibiting transmissions while performing the sequential lobing process is repeated continuously to eliminate inertial reference drift error which could otherwise eventually accumulate to an unacceptable level.

The above-described method does not significantly interfere with the transmission of data or other information from the antenna because the sequential lobing process can be performed in a matter of milliseconds.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein:

FIGS. 1a and 1b illustrates a sequential lobing process by which an antenna aperture can be pointed at a beam center of a received beam from a satellite;

FIG. 3 is a simplified diagram of an antenna aperture which performs transmit and receive functions, and illustrating the degree of error present when the pointing accuracy requirement during transmit is smaller than the step-size used in the sequential lobing process performed with a receive beam;

FIG. 4 is a simplified view of a mobile platform having an antenna aperture performing receive and transmit functions in communication with a target satellite;

FIG. 5 is a flowchart illustrating the steps performed in accordance with a preferred method of the present invention for more accurately acquiring and tracking a target satellite with an antenna aperture performing both transmit and receive functions located on a mobile platform;

DETAILED DESCRIPTION OF THE PREFERRED EMBODIMENTS

The following description of the preferred embodiment(s) is merely exemplary in nature and is in no way intended to limit the invention, its application, or uses.

Figure 2:
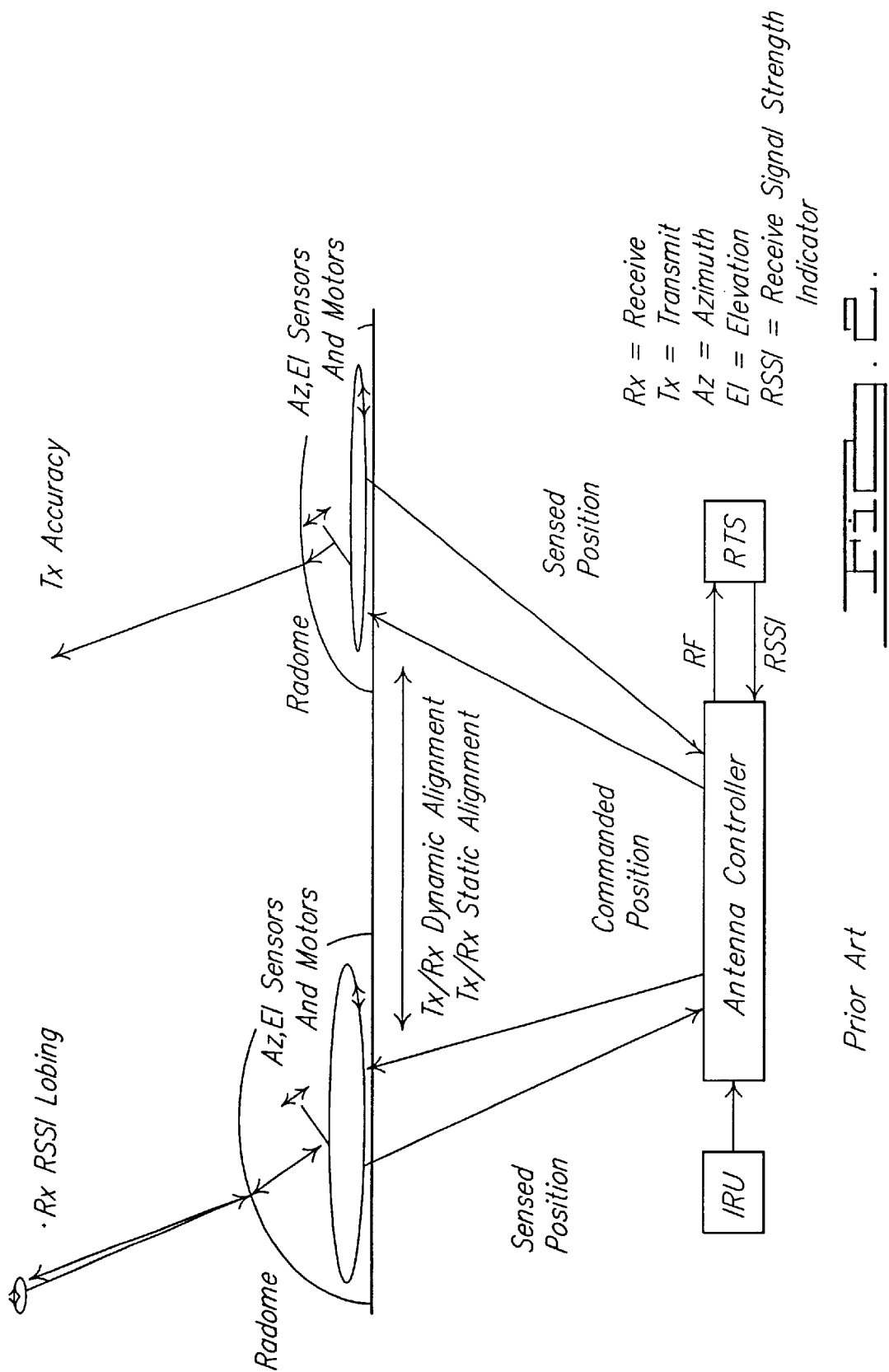
FIG. 2 illustrates separate receive and antenna apertures disposed on a mobile platform, with the transmit antenna aperture slaved to the pointing direction of the receive antenna aperture, and the inherent misalignment between the two antenna apertures because of the physical separation thereof on the mobile platform.

Referring to FIG. 4, there is shown a mobile platform 10 having an antenna aperture 12 in communication with a target satellite 14. The antenna aperture 12 is adapted to perform both receive and transmit functions so as to be able to receive signals from the satellite 14, as well as to transmit data and other information to the satellite. The satellite 14 typically carries one or more transponders 16 for transponding the signals to a ground station (not shown). It will also be appreciated that the mobile platform 10 includes an inertial reference unit (IRU), an antenna controller and a receive/transmit antenna subsystem, as indicated in FIGS. 2 and 3, for controlling pointing of the antenna aperture 12.

It will also be appreciated that while the mobile platform is illustrated as a fixed wing aircraft in FIG. 4, that the method of the present invention is applicable to any mobile platform such as a ship or a 1and vehicle.

Referring now to FIG. 5, the method of the present invention will be described. The method involves initially using the IRU of the aircraft 10 to acquire a signal from the satellite 14, as indicated at step 18. This signal is then optimized using the sequential lobing process described in connection with FIG. 1, as indicated at step 20. It will be appreciated that while the sequential lobing process is being performed, the antenna aperture 12 will be operating in a receive-only mode. Step 20 essentially causes the antenna controller of the aircraft 10 to center the antenna aperture 12 relative to the receive beam which it receives from the satellite 14.

Once the sequential lobing process is completed, the antenna 12 can be used to begin transmitting data, as indicated at step 22. As the attitude and location of the aircraft 10 change, another inertial reference unit in the form of an antenna rate gyro subsystem local to the antenna 12 is used to track the satellite 14 by re-pointing the antenna 12 as needed to maintain the antenna pointed at the satellite 14, as indicated at step 24.

Periodically the transmissions from the antenna 12 are inhibited, as indicated at step 26, and a sequential lobing process is again performed, as indicated at step 28. Step 28 essentially more accurately centers the antenna 12 on the receive beam to eliminate any inertial reference drift error that may have occurred since the initial sequential lobing process was performed at step 20.

Once the sequential lobing process performed at step 28 is complete, tracking of the satellite 14 using the antenna rate gyro of the aircraft 10 is resumed, as indicated at step 30. This process is repeated, as indicated by feedback line 32, continuously during flight of the aircraft 10. Typically, steps 26–30 may be performed in a manner of milliseconds while step 24 may be performed for a period of seconds to minutes. Thus, those time intervals during which sequential lobing is periodically performed are very brief relative to the time frame which the antenna rate gyro of the aircraft 10 is used to track the satellite 14. As a result, interruptions to the data transmissions from the antenna 12 are extremely brief and do not significantly impede the use of the antenna 12 to transmit information and/or data to the satellite 14.

Figure 6:
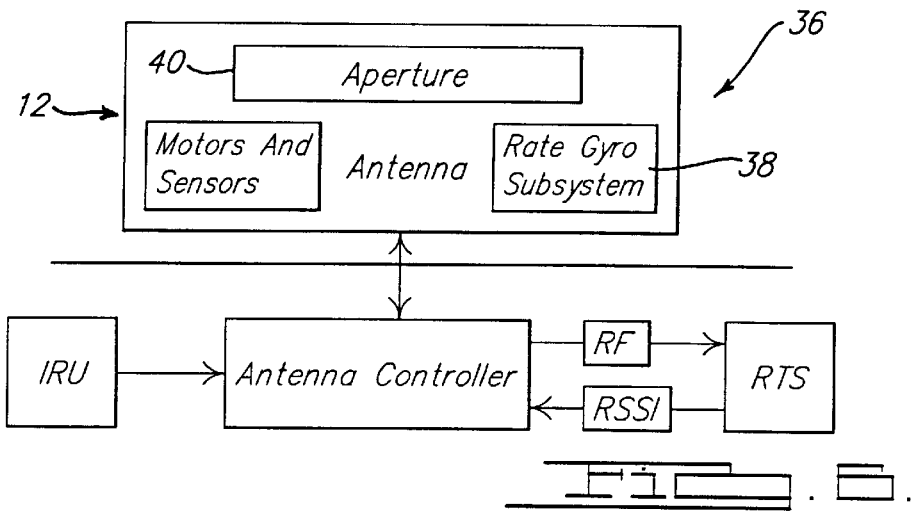
FIG. 6 is a simplified block diagram of a system in accordance with a preferred embodiment of the present invention.

FIG. 6 is a simplified block diagram of a system 34 in accordance with a preferred embodiment of the present invention. A motor and sensor subsystem 36 is used to monitor and control antenna positioning. A rate gyro subsystem 38 is used to provide inertial reference information used to aim the antenna aperture 40.

Figure 7:
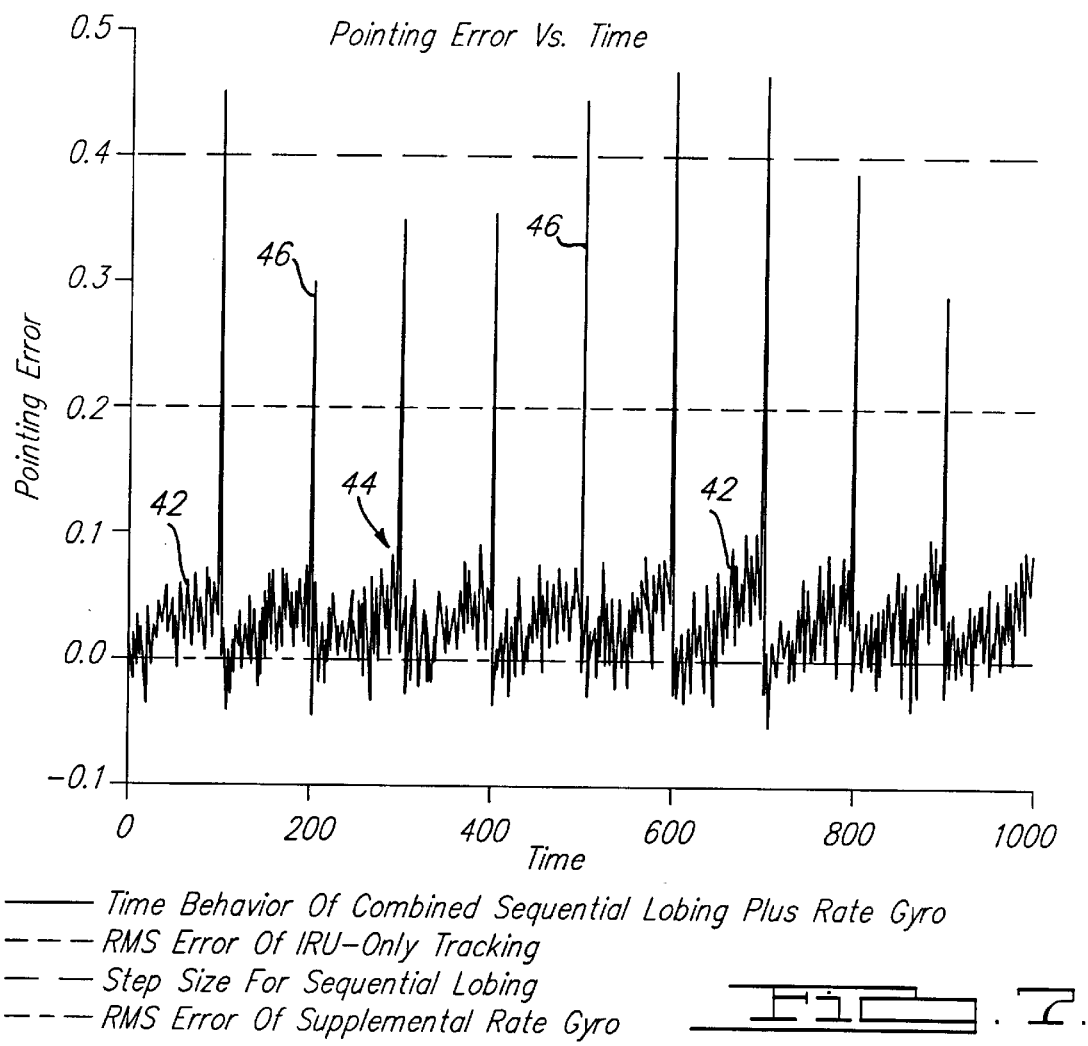
FIG. 7 is a graph illustrating how the method of the present invention continuously corrects for inertial drift error by periodically performing sequential lobing with the antenna.

FIG. 7 is a graph illustrating the pointing error versus time, and how the periodic, repeated sequential lobing serves to "re-center" the antenna 12. Portions 42 of waveform 44 indicate gradually increasing inertial drift error. Spikes 46 indicate those very short time periods (typically in milliseconds) during which the transmit function of the antenna 12 is inhibited while sequential lobing is performed to re-center the antenna relative to the receive beam.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A method for accurately pointing an antenna aperture performing receive and transmit functions at a target and tracking said target, wherein said antenna aperture is disposed on a vehicle having an inertial reference system (IRU), said method comprising the steps of:
    a) using said IRU to enable said antenna aperture to initially acquire said target;
    b) using a sequential lobing process while said antenna is performing a receive-only function to center said antenna aperture relative to a receive beam transmitted from said target;
    c) using information from an additional IRU located to said antenna aperture to track said target while said antenna aperture is transmitting; and
    d) intermittently interrupting said transmitting to perform said sequential lobing process of step b) to correct for inertial reference drift error.

2. The method of claim 1, wherein step c) is performed for a longer period of time than said sequential lobing process of step b).

3. A method for accurately pointing an antenna aperture performing receive and transmit functions at a target and tracking said target, wherein said antenna aperture is disposed on a mobile platform having an inertial reference system (IRU), said method comprising the steps of:

a) using said IRU to enable said antenna aperture to initially acquire said target;

b) using said antenna aperture in a receive-only mode to perform a sequential lobing process with a receive beam received from said target to center said antenna aperture on said target; and c) once step b) is completed, using an antenna rate gyro to maintain said antenna aperture pointed at said target; and d) periodically interrupting use of said antenna rate gyro in step c) to perform said sequential lobing process of step b).

4. The method of claim 3, wherein step c) comprises the step of transmitting information from said antenna aperture while said antenna rate gyro is being used to maintain said antenna aperture pointed at said target.

5. A method for accurately pointing an antenna aperture performing receive and transmit functions at a target and tracking said target, wherein said antenna aperture is disposed on a mobile platform having an inertial reference system (IRU) and said IRU has been used to initially acquire said target, said method comprising the steps of:

a) using said antenna aperture in a receive-only mode to perform a sequential lobing process with a receive beam received from said target to center said antenna aperture on said target; and b) when said sequential lobing process is completed, then using an antenna rate gyro to supply information for maintaining said antenna aperture pointed at said target while said antenna aperture is used to transmit information to said target; and c) periodically interrupting use of said antenna rate gyro in step b) to perform said sequential lobing process of step b) to correct for inertial reference drift error of said IRU, to thereby maintain said antenna aperture pointed at said target.

6. The method of claim 5, wherein step c) is performed for a shorter time period than step a).

7. A method for accurately pointing an antenna aperture performing receive and transmit functions at a target and tracking said target, wherein said antenna aperture is disposed on a mobile platform having an inertial reference system (IRU), the method comprising the steps of:

alternately using said antenna aperture in receive-only and transmit-plus-receive modes, wherein a sequential lobing process is performed while said antenna aperture is operating in said receive-only mode to point said antenna aperture at said target; and wherein a gyro local to said antenna aperture is used to maintain said antenna aperture pointed at said target when said antenna aperture is in said transmit-plus-receive mode.

8. The method of claim 7, further comprising the step of using said IRU to initially acquire said target before performing said sequential lobing process.

9. The method of claim 7, wherein said sequential lobing process is performed within a time frame substantially shorter than a time period during which said antenna aperture is used in said transmit-plus-receive mode.

10. A method for accurately pointing an antenna aperture performing receive and transmit functions at a target and tracking said target, wherein said antenna aperture is disposed on a mobile platform having an inertial reference system (IRU) and said IRU has been used to initially acquire said target, said method comprising the steps of:

a) using said antenna aperture in a receive-only mode to perform a sequential lobing process with a receive beam received from said target to center said antenna aperture on said target; and b) when said sequential lobing process is completed, then using an antenna rate gyro to supply information for maintaining said antenna aperture pointed at said target while said antenna aperture is used in a transmit-plus-receive mode to transmit information to said target; and c) periodically interrupting transmissions from said antenna aperture to re-perform said sequential lobing process of step a), to thereby maintain said antenna aperture pointed at said target.

11. The method of claim 10, wherein said sequential lobing process is performed within a time frame substantially shorter than a time period during which said antenna aperture is in said transmit-plus-receive mode.

12. The method of claim 11, wherein said sequential lobing process is performed in step a) in less than about one second.

* * * * *